United States Patent

[11] 3,542,215

| [72] | Inventors | Hans-Georg Fromme<br>Wetzlar;<br>Ernst Setzer, Stuttgart; Rudolf-Heinrich<br>Reitz, Oberquembach; Kurt Weller,<br>Dutenhofen, Germany |
|---|---|---|
| [21] | Appl. No. | 790,967 |
| [22] | Filed | Jan. 14, 1969 |
| [45] | Patented | Nov. 24, 1970 |
| [73] | Assignee | Fromme Forderanlagen GmbH<br>Wetzlar, Germany |
| [32] | Priority | Jan. 17, 1968 and Aug. 3, 1968 |
| [33] | | Germany |
| [31] | | 1,556,559 and 1,756,926 |

[54] ARTICLE SORTING INSTALLATION WITH AN ENDLESS CONVEYOR DISCHARGE MECHANISM
5 Claims, 8 Drawing Figs.

[52] U.S. Cl. ...................................................... 214/11,
198/38, 198/188
[51] Int. Cl. .............................................................. B65g 43/00
[50] Field of Search ............................................ 214/11;
198/38, 31A

[56] References Cited
UNITED STATES PATENTS

| 2,868,394 | 1/1959 | Greller et al. | 214/11 |
| 2,984,366 | 5/1961 | Greller et al. | 214/11 |
| 3,170,572 | 2/1965 | Harrison | 209/74 |
| 3,384,237 | 5/1968 | Leonard | 209/122 |
| 3,451,525 | 6/1969 | Greller | 198/38 |

*Primary Examiner*—Gerald M. Forlenza
*Assistant Examiner*—Raymond B. Johnson
*Attorney*—Krafft & Wells ABSTRACT: A sorting installation being arranged above a main conveyor belt and being adapted to move the transported goods sideways off said conveyor belt onto one of a plurality of smaller delivery belts which transport the goods to their final places of destination. The installation includes two endless chains arranged in parallel above the main conveyor belt and rotating vertically with a velocity equal to that of the main conveyor belt. The chains are linked by bars whereon one stripper is arranged slideably on each bar. Guide rails being provided above and along the two sides of the main belt adapted to guide the strippers in lateral direction with junction rails interconnecting said guide rails, and switches being arranged at each intersection, which switches are controlled electromagnetically. The switches are operated according to a predetermined program, thereby guiding one or more strippers from one guide rail along a junction rail in a transverse movement across the main conveyor belt to the parallel guide rail, thereby pushing a piece of goods off the main conveyor belt onto one of the delivery belts.

Patented Nov. 24, 1970

INVENTORS
Hans-Georg Fromme
Ernst Setzer
Rudolf-Heinrich Reitz
Kurt Weller

INVENTORS
Hans-Georg Fromme
Ernst Setzer
Rudolf-Heinrich Reitz
Kurt Weller

Patented Nov. 24, 1970

3,542,215

INVENTORS
Hans-Georg Fromme
Ernst Setzer
Rudolf-Heinrich Reitz
Kurt Weller

ARTICLE SORTING INSTALLATION WITH AN ENDLESS CONVEYOR DISCHARGE MECHANISM

CROSS-REFERENCES TO RELATED APPLICATIONS

Applicants claim priority under 35 USC 119 for applications P 15 56 559.0 and P 17 56 926.5 filed Jan. 17, 1968 and Aug. 3, 1968 respectively in the Patent Office of the Federal Republic of Germany.

BACKGROUND OF THE INVENTION

The invention relates to a sorting installation of the type used in mail order houses, post offices, train stations, air terminals etc.

The conveying and sorting installations of the prior art usually comprise a plurality of steel plates that are supported and dragged by an endless chain. For the purpose of sorting the transported goods one or more of the plates are suddenly titled as a consequence whereof the goods are thrown off the plates at certain required and predetermined places.

However, it is a disadvantage of these prior art devices that between adjacent plates there is always a space or gap. These gaps constitute a source of danger if the transported goods are not containers having even outer surfaces. If, for example, luggage is to be transported, as is almost constantly done at train stations and air terminals, the suitcases and handbags often have large handles and/or tags attached to them which may get caught in the gaps between the plates and become torn off, as a consequence whereof the piece of luggage can get lost or misplaced for a longer period of time.

It is therefore an object of the invention to provide a sorting installation which overcomes the above mentioned disadvantage. To this end it would be obvious to use a conveyor belt which does not have plates and therefore does not have gaps between them. However, with belts the problem exists how to remove the transported goods at their place of destination without tilting or otherwise twisting the belt as can be done with the plates.

More particularly it is therefore the object of the invention to provide a sorting installation for a conveyor system which makes use of a belt as the means of transportation and which still allows for an accurate sorting of the goods without twisting or otherwise mishandling the conveyor belt.

SUMMARY OF THE INVENTION

According to the invention the above stated object is attained by arranging two endless chains above and in parallel to the sides of the main conveyor belt which chains rotate vertically with a velocity equal to that of the belt. The chains are linked to each other by hollow slotted bars that extend perpendicularly to the direction of movement of the chains and each bar carries a stripper which is arranged slideably on this bar. Two guide rails for the strippers are also mounted above and in the direction of the sides of the belt, and junction rails are arranged between them that extend transversely across the belt. The guide rails and the junction rails are interconnected by means of electromagnetically operable switches.

When put into operation one switch will direct one or more strippers from a middle rail to the left-hand side guide rail or to the right-hand side guide rail and another switch will direct the strippers from the guide rail to one particular junction rail and from there to the other guide rail. As a consequence thereof the strippers will move transversely across the conveyor belt, either from left to right or vice versa, and, since they extend down to just above the belt surface, will push a piece of luggage to one side or the other off the belt at predetermined places.

From these places smaller delivery belts rotate in a direction inclined to the direction of the large conveyor belt and the pieces of luggage are automatically pushed on those smaller delivery belts that transport the goods to their final places of destination.

The strippers rotate vertically along an oblong path together with the two endless chains on which they are mounted. Now, in order not to require too much space above the chains when the strippers swing upwards, the latter are subdivided into a solid rod and a pipe that is placed over the rod so as to form a telescopic arrangement which folds when the strippers swing upwards and which unfolds when they again swing downwards.

Although there are provided two guide rails for the strippers in parallel to the sides of the conveyor belt, as described above, these two guide rails are present only along the lower tract of the oblong path. Along the upper tract there is provided only one guide rail in the middle between the two chains. Therefore the beginning and the end of the lower two-rail-tract forms a fork which leads up from the lower two-rail-tract to the upper one-rail-tract and vice versa. The fork at the beginning of the two-rail-tract (in the direction of travel of the strippers) is provided with a switch by means of which it is possible to direct the strippers to the left-hand side or the right-hand side guide rail as will be described in more detail hereinafter.

One particular problem of the invention is presented by the switches. On the one hand the bars whereon the strippers are slideably arranged, i.e. the strippers themselves, are mounted rather close together. In the embodiments of the invention which have so far been put to trials the distance of the strippers average 5 inches. Now, in order to achieve good efficiency the installation is required to operate at a rather high speed, this speed averaging 3 feet per second. As a result of both requirements the operating time of a switch must be as short as approximately one-seventh of a second.

On the other hand all switch tongues must be rather long in order to require only a small pivoting movement and to have a rather long radius of curvature. Since, however, the strippers follow each other at such a short distance a first stripper would still be in contact with and be guided by the switch tongue, when the tongue should already be pivoted in the other direction, in order to properly guide the next stripper in this other direction. As a consequence thereof the installation would completely jam.

In order to avoid this jamming there are, according to the invention, two recesses provided in the switch tongues at a distance from the free end of the tongue which is smaller than the distance between two adjacent strippers. The recesses are arrange at opposite sides of the tongues so as to form a contraction between them. Thereby it is assured that the tongue can already pivot to the opposite direction when the stripper just guided in a first direction is still in contact with the guiding surface of the tongue.

The first stripper must of course still be guided, even when it moves in the recess area with the switch tongue pointing the other way. To this end the sides of the U-shaped guide rails and junction rails respectively, which normally are cut away in the switch areas, are in these places only cut away to half of their height with the remaining half providing the necessary guidance for the stripper. In order to correspond with the remaining half of the rail sides, the material of the switch tongue is also removed to half of its thickness, so that the tongue can still pivot in a manner to be described in more detail hereinafter.

DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
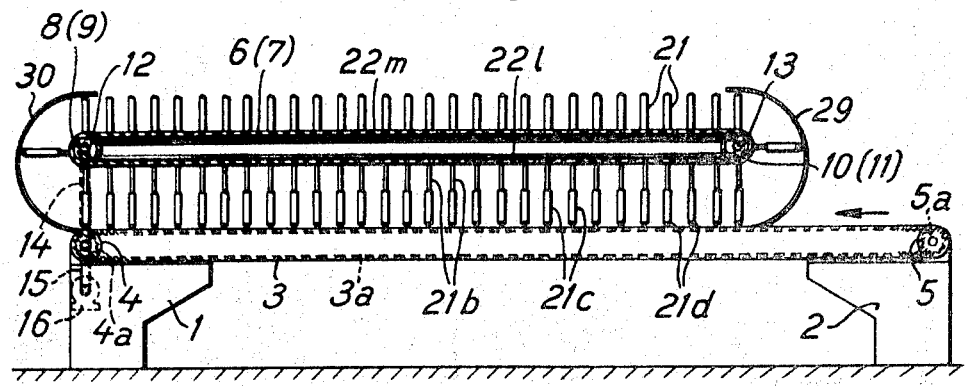
FIG. 1 is a schematic elevational view of the sorting installation.

Referring now to FIG. 1 the main conveyor belt 3 is suspended between the two drums 4 and 5 that are supported in bearings on the two stands 1 and 2 respectively. The conveyor belt 3 is on its inner surface provided with a flexible rack 3a (FIG. 3) which is win mesh with gears 4a, 5a on the drums 4 and 5.

Above the conveyor belt 3 there are arranged two endless chains 6,7 so as to rotate vertically along an oblong path and in parallel to the sides of the belt. Two shafts 12 and 13 are supported stationarily but rotatably overhead belt 3, and two chain wheels 8,9 and 10,11 are mounted on each shaft. The chain wheels carry and drive the chains. Drum 4 and shaft 12 (with the chain wheels 8,9) are driven synchronously by motor 16 (FIG. 3) and by means of belts or chains 15,14.

Figure 4:
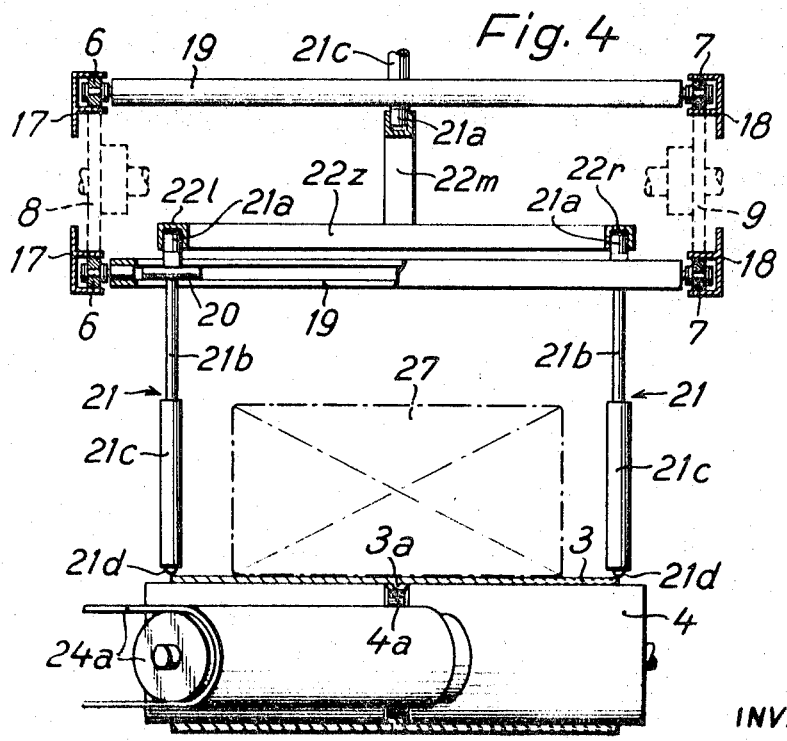
FIG. 4 is a schematic sectional view of the complete sorting installation in front of one of the delivery belts.

Between the return points, i.e. between the chain wheels 8,10 and 9,11 the chains are guided in rails 17,18 (FIG. 4). Bolts 6a and 7a are secured at regular intervals to the links of each chain so as to extend towards the opposite chain, and bars 19 are supported on two opposite bolts (FIG. 4). The bars 19 are hollow (and thus could also be termed pipes) and are provided with two axially extending slots 19a, 19b, one above the other in vertical direction. A guide block 20 is laterally displaceable inside each bar 19 and a stripper 21 is rigidly connected to each guide block 20.

Figure 2:
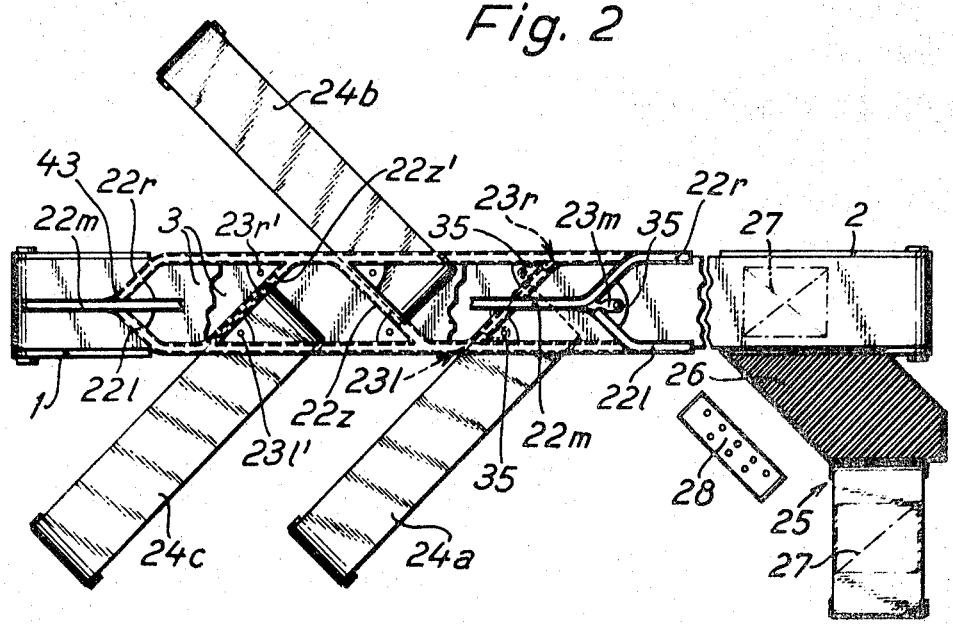
FIG. 2 is a schematic top view of the sorting installation with the chains and strippers omitted.
Figure 3:
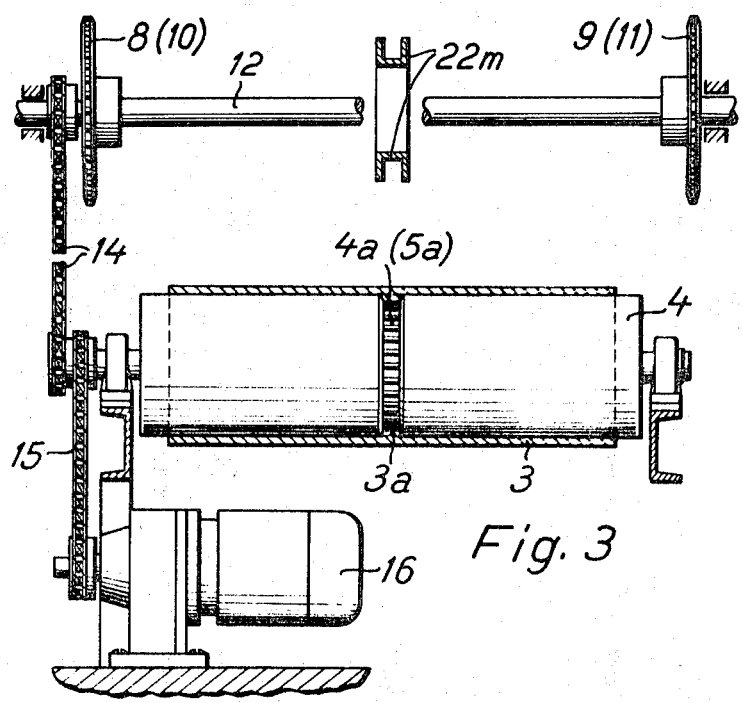
FIG. 3 is a schematic sectional view of the conveyor belt, the chain wheels, the motor, and the driving gears.

The stripper 21 consists of the head portion 21a which extends through the upper slot 19a and the working portions 21b and 21c which extend through the lower slot 19b and are foldable in a telescopic manner. The head portions 21a move along all of the oblong path in guide rails 22 which in the upper portion of the path consist of only one rail 22m arranged in the middle (FIGS. 3 and 4). This middle rail 22m, however, forks in front of the chain wheels 8,9 and 10,11 in two different rails, namely a left-hand side guide rail 22l and a right-hand side guide rail 22r (FIG. 2). At the place where rail 22m forks into the rails 22l and 22r in front of the chain wheels 10,11 a switch 23m is provided, the tongue of which can be electromagnetically shifted from the left to the right side and vice versa (FIGS. 5 and 6).

Figure 8:
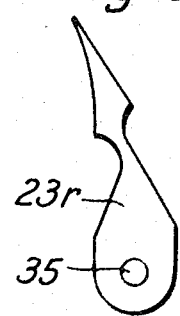
FIG. 8 shows a switch having a differently formed tongue.

The rails 22l and 22r extend in parallel to and overhead the main conveyor belt 3 all along the lower tract of the oblong path. Both guide rails 22l and 22r are interconnected by junction rails 22z and at the intersections of guide rails and junction rails switches are installed. These switches 23r and 23l are provided with unsymmetrical tongues which are bent in the direction of the junction rail either to the right or to the left (FIG. 8).

Figure 5:
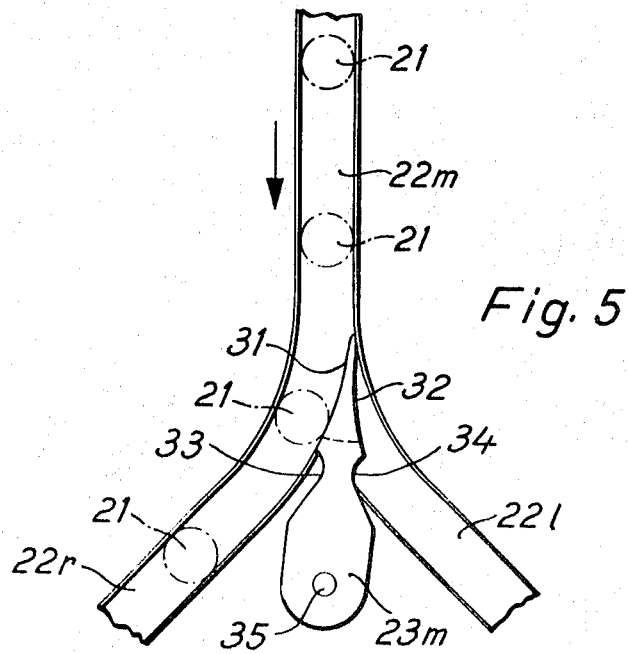
FIG. 5 is an enlarged top view of one of the switches in a first operating position.
Figure 6:
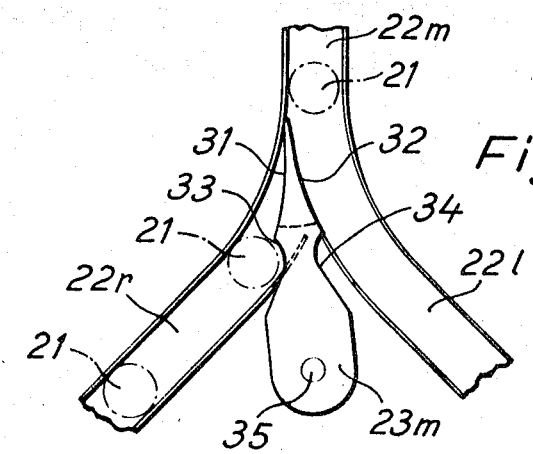
FIG. 6 is an enlarged top view of one of the switches in a second operating position.

As is readily discernible from FIGS. 5 and 6 the switch tongue 23m has two curved edges 31,32 adapted to guide the strippers 21 either towards guide rail 22l or 22r. At a distance D from the tip of the tongue (FIG. 5), which distance is shorter than the distance of two adjacent strippers 21 (= 5 inches), the edges 31,32 form two recesses 33,34 at either side of the tongue. FIG. 6 illustrates that by these recesses 33,34 it is possible to pivot tongue 23m already towards the opposite direction even if the previous stripper 21 has not yet left the curved portion of the rail.

Figure 7:
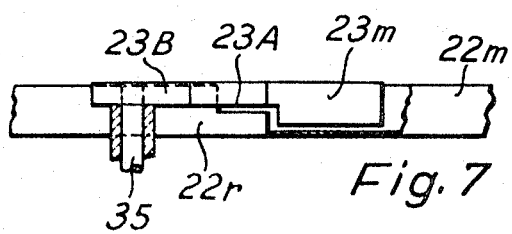
FIG. 7 is an enlarged side view of the switch tongue and the guide rail.

Between the recesses 33,34 and from there in the direction to pivot 35 the material of tongue 23m is removed to half its thickness as illustrated in FIG. 7 and indicated by numeral 23A. In the area of the edges 31,32 the sides of the rails 22l and 22r are cut away completely, however, in the area of the recesses 33,34 these sides are only cut away to half of their height. The remaining half side cooperates with the end of the tongue that is removed in its thickness in the manner illustrated in FIG. 7. Thus in this area the remaining sides of the rails provide for the necessary guidance of the strippers.

Around the chain wheels 8,9 and 10,11 respectively are arranged two pieces of curved sheet metal 29,30 (shown in FIG. 1 but omitted in FIG. 2). Piece 30 serves to gradually fold the working portions 21b, 21c of each stripper 21 as the latter swings upwards around chain wheels 8,9 from its lower path into its upper return path. Likewise piece 29 serves to gradually unfold these working portions of each stripper when it swings around chain wheels 10,11 from the upper path to the lower path. It should be noted that working portion 21c hangs loosely on portion 21b so that under the influence of gravity portion 21c falls down as each stripper swings around the chain wheels 10,11 and piece 29 is arranged to prevent any jerking when each stripper unfolds.

At a longer or shorter distance from the sorting installation (as conditions may require) is arranged the feeding station 25 of the goods to be transported. At a switch desk 28 the data of each transported piece 27, i.e. mainly its place of destination, is programed in an electronic control device and by means of a roller conveyor 26 the piece 27 is moved on the main conveyor belt 3.

In the area of the sorting installation delivery conveyors 24a, 24b, 24c are arranged in directions inclined to the transporting direction of the main conveyor belt 3 (FIG. 2). It is, of course, the object of the described installation to transport each piece of goods automatically from the feeding station 25 to this one delivery belt that will bring the piece in question to its final place of destination.

The above described sorting installation functions as follows: The main conveyor belt 3 and the chains 6,7 with the strippers 21 rotate with equal velocity. A piece of goods 27 is placed on the feeding station 25 and is moved along the roller conveyor 26 to the main conveyor belt 3. At the same time the destination of the piece is programed into the control device at switch desk 28, and for the purpose of the present description be it assumed, that this place of destination is reached by way of delivery belt 24c. The strippers 21 move along the upper path in the middle rail 22m in line, one behind the other. Programing the data into switch desk 28 results in the tongue of switch 23m being pivoted to the left (FIG. 2) about pivot 35, as a consequence whereof one or more strippers 21 will be guided towards the right-hand side guide rail 22r wherein they will swing downwards and unfold at precisely the same moment when piece 27 passes beneath the chain wheels 10,11. Thus the required number of strippers are placed along the right side of piece 27 with which they will move along since belt 3 nd chains 6,7 rotate at equal speed.

Programing the data of piece 27 into the electronic control device also results in a command being given to the switches 23r' and 23l' to pivot their tongues to the left and to the right respectively, so that by switch 23r' the approaching strippers 21 are guided from guide rail 22r to junction rail 22z' and by switch 23l' to guide rail 22l. On their way from guide rail 22r transversely across belt 3 towards guide rail 22l the stripper 21 push piece 27 off the main conveyor belt 3 onto the delivery belt 24c which transports piece 27 to is final place of destination.

The strippers 21 move along in guide rail 22l which joins with guide rail 22r at a junction point 43 in the middle between the chains 6,7 to form the middle guide rail 22m. The latter then swings upwards so that the strippers 21 can return to switch 23m.

As indicated in FIG. 2 the middle section of guide rail 22m can be omitted since the strippers need not be guided in lateral direction during their return travel. To provide a middle guide rail 22m is absolutely necessary only near the chain wheels 8,9 and 10,11.

We claim:

1. A sorting installation arranged above a main conveyor belt 3 and being adapted to move the transported goods sideways off said main conveyor belt onto one of a plurality of delivery belts 24a,24b,24c said installation including:

an endless chain 6,7 being arranged in parallel to either side of said conveyor belt, each chain rotating vertically along an oblong path between two chain wheels 8,10; 9,11, and one wheel of each chain together with the corresponding wheel of the other chain being mounted on a common shaft 12,13;

slotted hollow bars 19 connecting opposite links of both chains;

strippers 21 being slideably mounted on said bars;

a middle guide rail 2m adapted to guide said strippers in the middle when said strippers move along the upper tract of said oblong path;

two side guide rails 22l,22r adapted to guide said strippers in parallel to the sides of said conveyor belt when said strippers move along the lower tract of said oblong path;

junction rails 22z interconnecting said guide rails; and switches 23m,23l,23r being arranged at the intersections of said middle guide rail and said side guide rails and of said side guide rails and said junctions rails, said switches being adapted to guide said strippers from said middle guide rail to either one of said side guide rails and from there to either one of said junction rails.

2. A sorting installation as claimed in claim 1 wherein said switches are electromagnetically operable according to commands preprogrammed in an electronic control device.

3. A sorting installation as claimed in claim 1 wherein the tongues of said switches are provided with recesses 33,34 on either side so as to form a contraction between them at a distance from the tip of the tongue which is shorter than the distance between two adjacent strippers, and wherein the material of said tongues in the range of said recesses is removed to half of the thickness of the remaining tongue portion in order to cooperate with the guiding edges of said guide rails and junction rails, said guiding edges in said range being cut away to a corresponding height.

4. A sorting installation as claimed in claim 1 wherein said strippers are collapsible in a telescopic manner.

5. A sorting installation as claimed in claim 4 wherein said strippers comprise a solid rod 21b and a pipe 21c, said rod carrying a guide block 20 adapted to slide laterally within said slotted hollow bar 19 and said pipe being adapted to slide vertically on said solid rod.